(12) United States Patent
Tam

(10) Patent No.: US 9,336,214 B2
(45) Date of Patent: May 10, 2016

(54) FILE-NAME EXTENSION CHARACTERS FOR FILE DISTRIBUTION

(75) Inventor: Daniel S. Tam, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 736 days.

(21) Appl. No.: 13/147,091

(22) PCT Filed: Jan. 31, 2009

(86) PCT No.: PCT/US2009/032760
§ 371 (c)(1),
(2), (4) Date: Jul. 29, 2011

(87) PCT Pub. No.: WO2010/087858
PCT Pub. Date: Aug. 5, 2010

(65) Prior Publication Data
US 2011/0289127 A1    Nov. 24, 2011

(51) Int. Cl.
   G06F 7/00       (2006.01)
   G06F 17/30     (2006.01)

(52) U.S. Cl.
   CPC .............................. G06F 17/30067 (2013.01)

(58) Field of Classification Search
   None
   See application file for complete search history.

(56) References Cited

U.S. PATENT DOCUMENTS

| | | | |
|---|---|---|---|
| 5,504,892 A * | 4/1996 | Atsatt et al. ................... | 707/822 |
| 6,370,614 B1 | 4/2002 | Teoman et al. | |
| 6,438,642 B1 | 8/2002 | Shaath | |
| 6,854,035 B2 | 2/2005 | Dunham et al. | |
| 6,996,670 B2 | 2/2006 | Delaire et al. | |
| 7,395,389 B2 | 7/2008 | Kaplan et al. | |
| 7,430,593 B2 | 9/2008 | Baldwin et al. | |
| 7,555,781 B2 * | 6/2009 | Feuerstein et al. .............. | 726/26 |
| 2002/0078066 A1 | 6/2002 | Robinson et al. | |
| 2002/0147985 A1 * | 10/2002 | Miyajima et al. ............. | 725/109 |
| 2003/0065873 A1 * | 4/2003 | Collins ................ | G06F 3/0601 711/100 |
| 2004/0205109 A1 * | 10/2004 | Hara et al. ..................... | 709/201 |
| 2004/0268040 A1 | 12/2004 | Bum et al. | |
| 2006/0074945 A1 * | 4/2006 | Mori ................. | G06F 17/30123 |
| 2006/0085428 A1 * | 4/2006 | Bozeman et al. ............... | 707/10 |
| 2006/0143419 A1 | 6/2006 | Tulyani | |
| 2006/0150253 A1 * | 7/2006 | Feuerstein et al. .............. | 726/26 |
| 2006/0161635 A1 * | 7/2006 | Lamkin et al. ................ | 709/217 |
| 2007/0016530 A1 * | 1/2007 | Stasi et al. ...................... | 705/52 |
| 2007/0143740 A1 | 6/2007 | Hoerentrup et al. | |
| 2007/0226547 A1 | 9/2007 | Takata et al. | |
| 2007/0276989 A1 | 11/2007 | Mosek et al. | |
| 2007/0276990 A1 | 11/2007 | Mosek et al. | |
| 2008/0034006 A1 * | 2/2008 | Lee ................... | G06F 17/30115 |
| 2008/0040716 A1 * | 2/2008 | Lam et al. ......................... | 718/1 |
| 2008/0235432 A1 * | 9/2008 | Chen et al. ..................... | 711/100 |
| 2008/0263259 A1 | 10/2008 | Sadovsky et al. | |

OTHER PUBLICATIONS

WIPO, International Search Report, dated Sep 1, 2009, PCT/US2009/032760, filed Jan. 31, 2009.

* cited by examiner

*Primary Examiner* — Tuan A Pham
(74) *Attorney, Agent, or Firm* — HP Inc Patent Department

(57) ABSTRACT

A file is written or not written to a first storage medium (as opposed to a second storage medium) as a function of its distribution-priority file-name extension character or characters and an available capacity of the first storage medium. A system includes a manufacture in the form of a computer-readable storage medium tangibly encoded with software. The software includes an operating system that, when executed, selects a first storage medium or a second storage medium to which to write a target file as a function of distribution-priority file-name extension characters of a file name for the target file and of available capacity on the first storage medium.

12 Claims, 3 Drawing Sheets

FILE-NAME EXTENSION CHARACTERS FOR FILE DISTRIBUTION

BACKGROUND

As it has become more affordable, capacious solid-state memory has increasingly assumed the mass storage role conventionally occupied by hard disks. Solid-state drives (SSDs) tend be faster, more robust, and more power efficient that hard-disk drives (HDDs). Thus, some computers include SSDs in lieu of HDDs. However, SSDs are (presently) more expensive than HDDs for a given storage capacity so computers with HDDs remain prevalent.

BRIEF DESCRIPTION OF THE DRAWINGS

The figures depict implementations/embodiments of the invention and not the invention itself.

DETAILED DESCRIPTION

A computer can include a SSD and a HDD to obtain the advantages of each. An operating system for such a computer determines whether to write a file to the SSD or the HDD (or both). This is a special case of distributing files between a smaller faster storage device and a larger slower storage device. Herein, some example embodiments disclose using file-name extensions to prioritize files for writing to the smaller-faster SSD.

Figure 1:
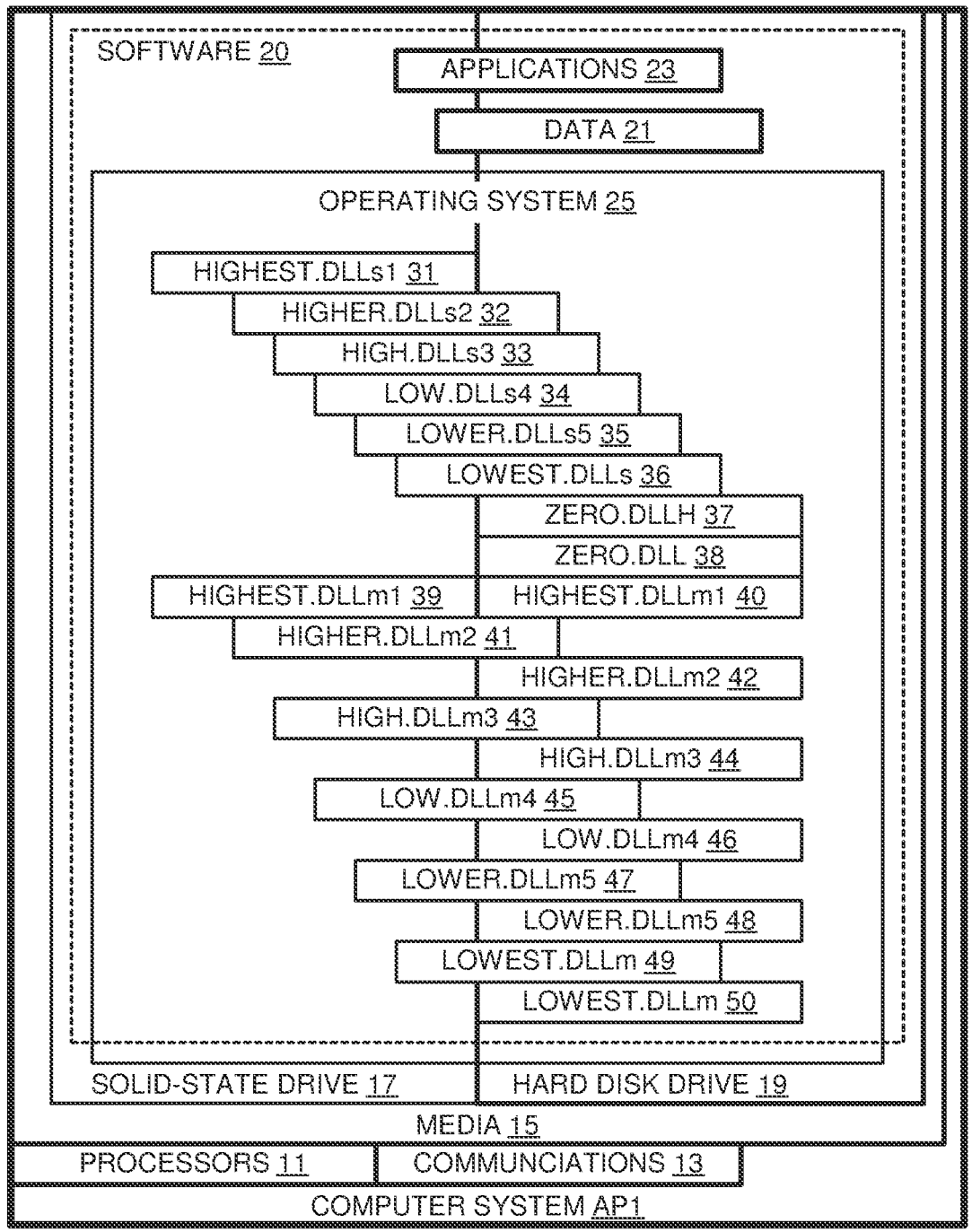
FIG. 1 is a schematic illustration of a computer system in accordance with an embodiment of the invention. The computer system includes both an SSD and an HDD. Some files are depicted as crossing the boundary between the SSD and HDD. The degree to which such a file is shown in the SSD is roughly indicative of a probability of it being found or written to the SSD.

As shown in FIG. 1, a computer system API includes processors 11, communications devices 13, and computer-readable storage media 15. Media 15 includes manufactures in the form of a solid-state drive (SSD) 17 and a hard-disk drive (HDD) 19. Collectively they store tangible memory states constituting software 20, including data 21, applications 23, and an operating system 25. Operating system 25 includes a number of "dynamically-linked-library" or "DLL" files 31-51.

Each DLL file is given a file name that includes a base, a period, and an extension. For example, DLL file 31 has the file name "HIGHEST,DLLs1". (Note uppercase and lower case are not distinguished in these file names.) This file name includes a base "HIGHEST", a period, and an extension "DLLs1". The extension includes two sections: the first three characters "DLL" are file-type extension characters and define a Me type for file 31. The last two characters are "distribution-priority" characters and are used to help determine whether they are written to smaller-faster SSD 17 or larger-slower HDD 19. In the case of file 31, the fourth character is an "s", indicating it is to be stored in SSD 17 if possible; the fifth character is a "1" indicating it has the highest priority for storage in SSD 17. It is to be stored in SSD 17 (as indicated in FIG. 1) unless SSD 17 is already full with highest-priority files.

File 32 has a file name "HIGHER.DLLs2". In this case, the fourth character is "s", indicating the file is to be stored preferentially in SSD 17. However, fifth character is a "2" (as opposed to "1" for file 31), indicating its priority rating is below that of files with distribution-priority s1. Thus, file 32 could be removed from solid-state disk 17 to make room for file 31. On the other hand, file 32 would not be removed to make room for files with fifth characters of "3" (e.g., file 33), "4" (e.g., file 34), or "5" (e.g., file 35). Note that files 32-35 are shown in FIG. 1 as straddling an abstract boundary between SSD 17 and HDD 19. This straddling corresponds very schematically to probability distribution of finding a file in SSD 17 versus finding it in HDD 19. (Straddling does not indicate that the file is partially stored in SSD 17 and partially stored in HDD 19.)

File 36 has a distribution-priority extension section "s", without a fifth character. This is treated as a preference for storage in SSD 17, but with a lower priority than a file with an "s5" distribution-priority extension section. For file 37, the fourth extension character is "Ii" and there is no fifth character. The "h" indicates that file 37 is to be preferentially stored on HDD 19. No fifth character is used to indicate priority since HDD 19 is presumably sufficiently capacious that file 37 will fit without moving files to SSD 17.

File 38 has a file name (ZERO.DLL) with a file-type extension section but no distribution-priority extension characters. In the illustrated embodiment, such a file is treated as if it had an "s" extension with no fifth character; in other words it is treated as if it had an "h" for the fourth character. In an alternative embodiment, a file lacking distribution-priority extension characters is treated as if it had an s3 extension. In another embodiment, such a file is distributed according to file type (or its file-type extension section).

For some files, e.g., files 39-50, it is preferably to store then in both SSD 17 and HDD 19, e.g., for backup. The fourth character "m" is used as the fourth character in these files. Thus, in FIG. 1, files 39 and 40 are duplicates and have the same file name "HIGHEST.DLLM1". Such "m" files can have a priority indicator of 1-5, this fifth character has the same basic meaning as the fifth character for the "s" files. Thus, file 45, which has a distribution-priority extension of "m3" has a priority higher than file 34 (with an s4), but lower than file 32 (with an s2). However, in the case of a tie at the fifth character, the file with the "s" extension has priority over the file with the "m" extension, since the latter has a copy on HDD 19. If an "m" file is removed from SSD 17 to make room for a higher-priority file, it is simply deleted rather than moved (as an "s" file would be") because of the copy already in place on HDD 19. How these distribution-priority characters are used is explained further with reference to a method flow charted in FIG. 2.

Figure 2:
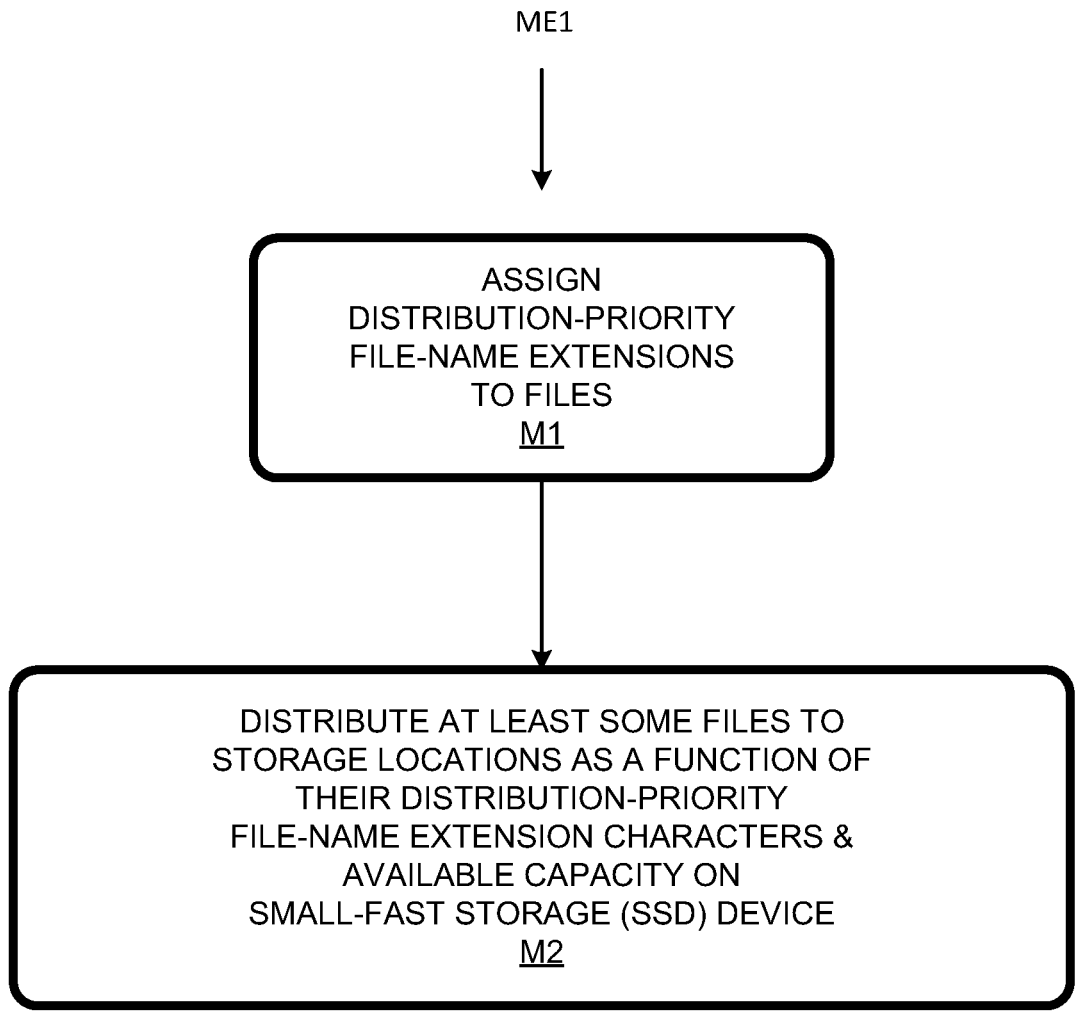
FIG. 2 is a flow chart of a method in accordance with an embodiment of the invention.

FIG. 2 is a flow chart of a method ME1 in accordance with an embodiment of the invention. Method segment M1 invoking assigning distribution-priority file-name extensions to files. This extension may be may or may not be in addition to another extension, e.g., a file-type extension. In the case where there is more than one extension type, the distribution-priority extension can be identified by an absolute position (e.g., $4^{th}$ and $5^{th}$ characters) or position relative to some delimiter within the extension (e.g., a period or other separator within the extension). If a preceding extension (e.g., file-type extension) has a fixed length, the distribution priority section can begin at the end of that. If it has a variable length, the preceding extension can be filled in with default values to a fixed length.

In the embodiment of FIG. 1, an "s" as the fourth-character used to indicate a preference for an SSD or other faster-smaller storage medium. "h" is used to indicate a preference for a HDD or other slower-larger storage medium. "m" is used for a preference for writing a file to both media. Other characters can be used, as can values other than 1-5 for indicating priority rankings.

Figure 3:
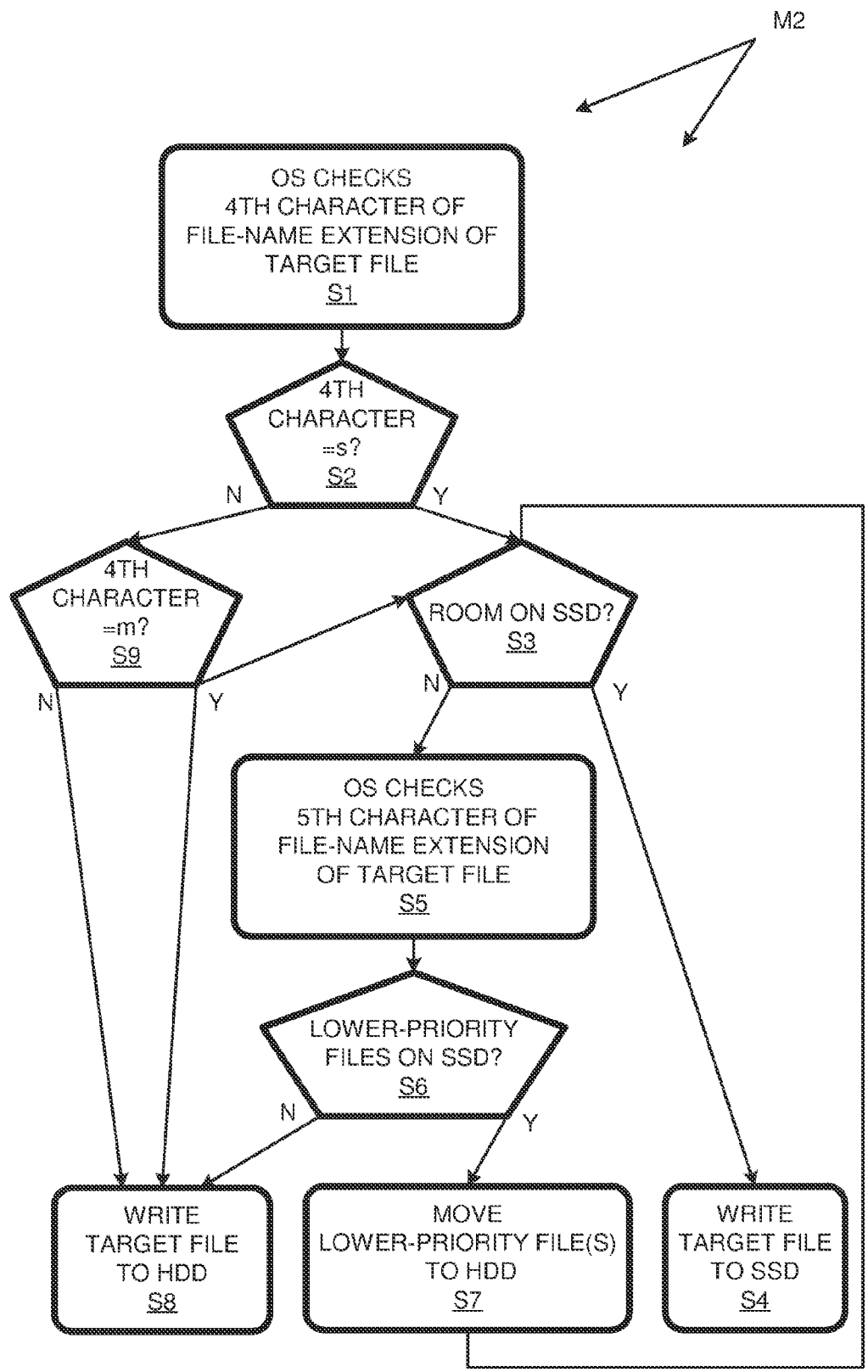
FIG. 3 is a flow chart of a method segment of the method of FIG. 2.

At method segment M2, files be written are distributed between media as indicated by the distribution-priority extension characters. Method segment M2 is detailed in FIG. 3. At step S1, an operating system checks the fourth character of a file-name extension for a target file. Step S2 involves determining whether the fourth character is or is not "s". If it is, step S3 calls for checking to determine with there is room on an SSD for writing the target file. If there is room, then step S4 calls for writing the target file to the SSD.

If at step S3, it is determined that there is not enough room for the target file, then at step S5, the operating system checks the 5$^{th}$ character of the file-name extension of the target file. This character can be a "1"-"5" or be absent, which is treated as if it were a "6", in other words, has the lowest priority.

At step S6, the operating system determines whether or not there is a file with a lower priority than the target file, i.e., has a higher priority number. If there is such a lower-priority file, it is moved to the hard disk at step S7. At this point, method segment S2 returns to step S3 to see if there is now sufficient room on the SSD. If there is sufficient room, the target file is written to the SSD. If there is not, another lower-priority file can be moved at S7. However, if it is not possible to make room for the target file by moving lower priority files, as determined at an iteration of S6, then the target file is written to the hard disk at step S8.

If at step S2, the operating system determines that the fourth character is not an "s", step S9 checks to determine if it is an "m" instead. If it is not an "m" (or an "s"), it is written to the HDD at step S8. Note that if the fourth character is not an "s" or an "m" is it either an "h" (indicating a preference for the hard disk, or absent, indicating a very low priority. In either case, the writing to the HDD is appropriate.

If at step S9, the operating system determines that the fourth character is "m", then it also writes the target file to the HDD. However, in the case of an "m", method segment M2 branches to S3 to determine if a copy of the target file should be written to the SSD. From step S3, method segment S2 proceeds as it would with an "s" file to determine whether or not to write the target file to the SSD. The exception is that, if at step S6, there is no room on the SSD that can be cleared by moving lower priority files, the "m" file is not written a second time to the HDD.

If the naming scheme varies from that used in FIG. 1, method ME1 and step S2 will vary accordingly. These and other variations upon and modifications to the illustrated embodiment are provided for by the present invention, the scope of which is defined by the following claims.

What is claimed is:

1. A method comprising:
    assigning distribution-priority file-name extension characters to files to indicate the respective priorities of said files to be written to a first storage medium as opposed to a second storage medium; and
    writing or not writing a target file to said first storage medium as a function of its distribution-priority file-name extension character or characters and an available capacity of said first storage medium, wherein said target file has a target filename including a target base name and a target extension, said target extension including one or more file-type characters and one or more distribution-priority characters, said distribution-priority characters being separate from said file-type characters.

2. A method as recited in claim 1 wherein said target extension includes a series of at least four characters including at least a fourth character, said fourth character indicating whether said target file should be distributed preferentially to said first medium or to said second medium or both.

3. A method as recited in claim 2 wherein said series of at least four characters includes at least a fifth character, said fifth character indicating a relative priority for being written to said first medium in the event it is necessary to remove one or more files from said first medium to make room for said target file.

4. A method as recited in claim 1 wherein said first medium is a solid-state drive and said second medium is a hard-disk drive.

5. A system comprising:
    a manufacture in the form of a computer-readable storage medium tangibly encoded with software, said software including an operating system that, when executed, selects a first storage medium or a second storage medium to which to write a target file as a function of distribution-priority file-name extension characters of a file name for said target file and of available capacity on said first storage medium; and
    a processor to execute said operating system,
    wherein said target file has a file name including a base file name and an extension, said extension including one or more file-type characters and one or more distribution-priority characters, said distribution-priority characters being separate from said file-type characters.

6. A system as recited in claim 5 wherein said extension includes a series of at least four characters including at least a fourth character, said fourth character indicating whether said target file should be distributed preferentially to said first medium or to said second medium or both.

7. A system as recited in claim 6 wherein said series of at least four characters includes at least a fifth character, said fifth character indicating a relative priority for being written to said first medium in the event it is necessary to remove one or more files from said first medium to make room for said target file.

8. A system as recited in claim 7 wherein said first medium is a solid-state drive and said second medium is a hard disk drive.

9. A manufacture comprising computer-readable storage media encoded with an operating system, said operating system, when executing, providing for:
    assigning distribution-priority file-name extension characters to files to indicate the respective priorities of said files to be written to a first storage medium as opposed to a second storage medium; and
    writing or not writing a target file to said first storage medium as a function of its distribution-priority file-name extension character or characters and an available capacity of said first storage medium, wherein said target file has a target filename including a target base name and a target extension, said target extension including one or more file-type characters and one or more distribution-priority characters, said distribution-priority characters being separate from said file-type characters.

10. A manufacture as recited in claim 9 wherein said target extension includes a series of at least four characters including at least a fourth character, said fourth character indicating whether said target file should be distributed preferentially to said first medium or to said second medium or both.

11. A manufacture as recited in claim 10 wherein said series of at least four characters includes at least a fifth character, said fifth character indicating a relative priority for being written to said first medium in the event it is necessary to remove one or more files from said first medium to make room for said target file.

12. A manufacture as recited in claim 9 wherein said first medium is a solid-state drive and said second medium is a hard-disk drive.

* * * * *